United States Patent [19]
LaCombe, Jr. et al.

[11] Patent Number: 5,094,570
[45] Date of Patent: Mar. 10, 1992

[54] INTERFACE UNIT FOR DRILLS

[75] Inventors: Arnold E. LaCombe, Jr., Holland; Ronald G. McNees, Grand Rapids, both of Mich.

[73] Assignee: Altron Automation, Inc., Wyoming, Mich.

[21] Appl. No.: 601,366

[22] Filed: Oct. 19, 1990

[51] Int. Cl.⁵ .................. B23B 45/04; B23B 47/22
[52] U.S. Cl. ........................... 408/130; 173/19; 251/129.15
[58] Field of Search ............... 408/10, 130, 129, 11; 173/19, 9, 159, 152, 163; 251/129.15, 150; 137/552.5, 624.11, 596; 91/454, 526, 397, 167 R

[56] References Cited
U.S. PATENT DOCUMENTS

| | | |
|---|---|---|
| 4,257,489 | 3/1981 | Westerberg .................. 173/159 |
| 4,397,334 | 8/1983 | Harrell ........................ 137/552.5 |
| 4,573,114 | 2/1986 | Ferguson et al. ............ 137/624.11 |
| 4,594,030 | 6/1986 | Weigel, Jr. .................. 408/130 X |

FOREIGN PATENT DOCUMENTS

| | | | |
|---|---|---|---|
| 1536965 | 7/1968 | France ........................ 173/19 |
| 519536 | 8/1976 | U.S.S.R. .................... 173/19 |
| 1293368 | 2/1987 | U.S.S.R. .................... 408/130 |
| 1295044 | 3/1987 | U.S.S.R. .................... 173/19 |
| 2197436 | 5/1988 | United Kingdom ........ 251/129.15 |

*Primary Examiner*—William Briggs
*Attorney, Agent, or Firm*—Price, Heneveld, Cooper, DeWitt & Litton

[57] ABSTRACT

A universal interface unit is provided for use with a pneumatic drill having an axially extendable tool holder, the interface unit being adaptable for use with 'valve in head' type and 'thru head' type pneumatic drills of different sizes. The interface unit includes a compact housing which fastens to the pneumatic drill and houses one or more proximity sensors for sensing the position of extendable tool holder and also houses valves for controlling air flow to the extend and retract ports of the drill. The proximity sensors sense the position of the extendable tool holder and send signals to a remote controller. The valves receives signals from the remote controller and communicate with the drill extend and retract ports to control the tool holder position. The valves are plumbed to be easily convertible for use with either the 'valve in head' type of 'thru head' type pneumatic drills by removing two plugs and changing a fitting. One or more unique air fittings are used to hold the interface unit to the pneumatic drill with a minimum of parts. The air fitting includes pipe threads for mating with the pneumatic drill extend and retract ports and also includes external standard threads for receiving a nut which secures a mounting plate to the drill. The interface unit is secured to the mounting plate in a manner which to locates the proximity sensors adjacent the proximity sensor targets located on a shaft connected to the extendable tool holder. A single universal bracket is designed to be used with different sizes of drills.

22 Claims, 4 Drawing Sheets

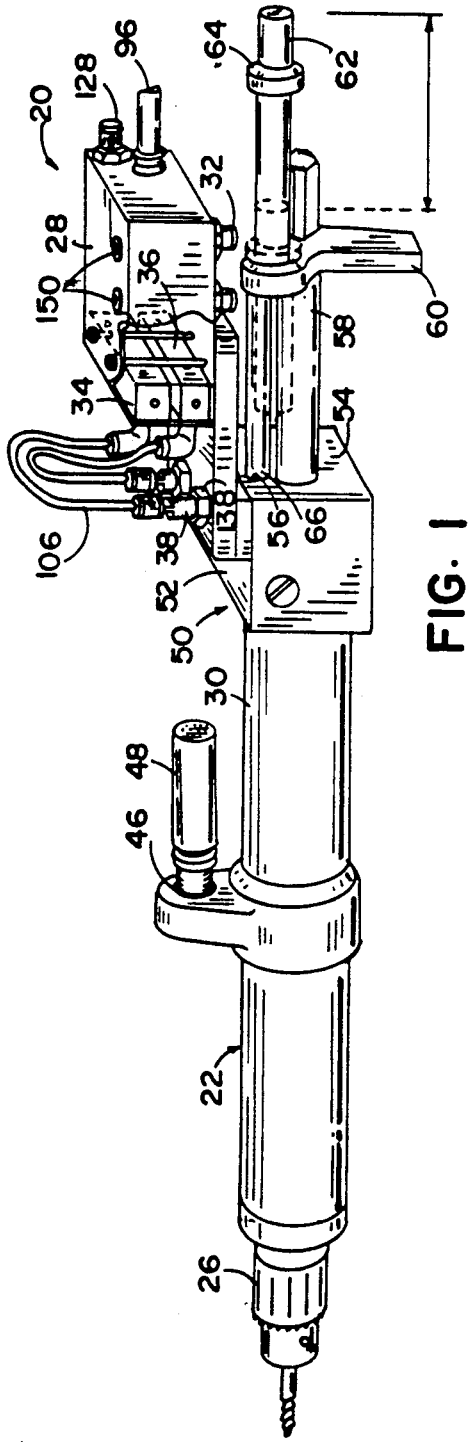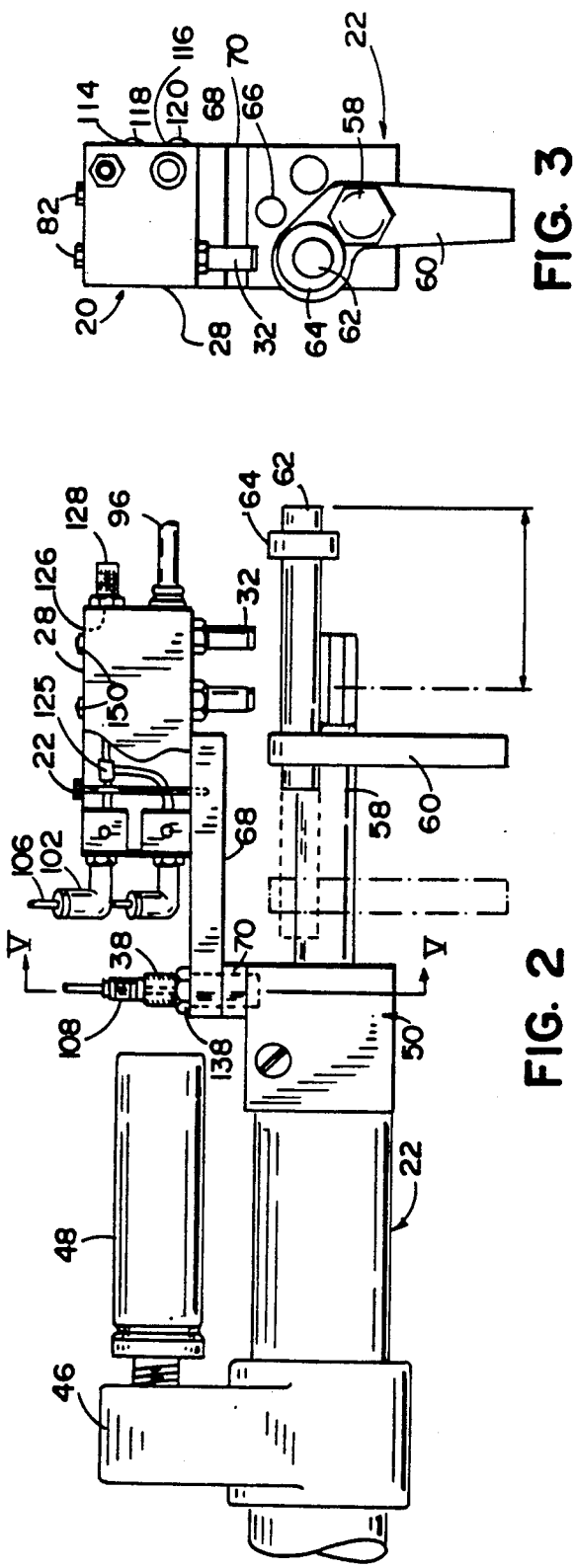

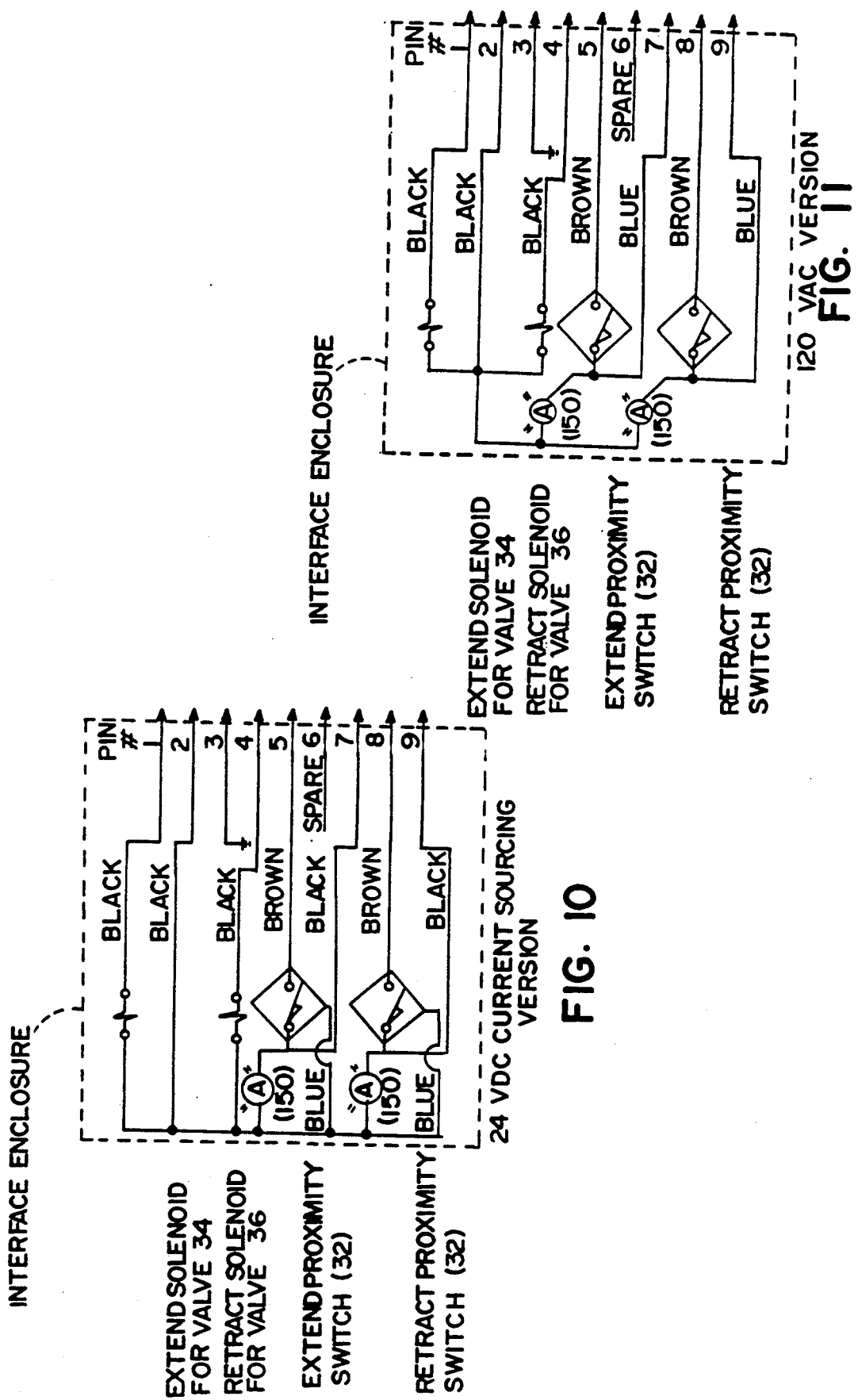

INTERFACE UNIT FOR DRILLS

BACKGROUND OF THE INVENTION

The present invention relates to an interface unit for use with pneumatic drills and, in particular, an interface unit which is adaptable for use on different types of commercially available drills having axially extendable tool holders.

Pneumatic drills having extendable tool holders which rotate as they extend and retract are peculiarly adapted for performing repetitive operations on articles placed before them. Such drills are well adapted for assembly-line type use, particularly where the access space to the required machining area is limited. Such drills are commercially available from a number of manufacturers.

A problem with such drills is that they required custom-designed interface piping, including electrically operated solenoid valves, in order to allow for automatic operation by a programmable controller. Furthermore, such conventional drills fall within two general categories: A first category including those drills which are actuated by switching a supply of compressed air to one port of the drill head, with the other such port being continuously vented to atmosphere ('thru head' type drills); and a second category including those drills which are actuated by venting one port while continuously deadheading or blocking the other port ('valve in head' type drills). Because of this division, it has previously been necessary to tailor the pneumatic piping to the particular type of drill purchased.

Another problem has been attachment of interface units and tool holder position indicators to the drills. Previously, custom-designed bracketry and attaching means have been required which, not only include custom parts, but are often bulky and take up too much space to use in limited machining areas. Furthermore, improvements in reliability, repairability and adjustability are desirable.

SUMMARY OF THE INVENTION

An interface unit is provided for use with a pneumatic drill having an axially extendable tool holder, the interface unit facilitating control over the pneumatic drill by a controller located remote from the drill. The interface unit includes a housing mounted to the drill and at least one valve located in the housing for communicating with the extend and retract ports on the drill. The controller controls the position of the tool holder by controlling the valves connected to the extend and retract ports. Another aspect of the invention is to provide means for sensing the position of the tool holder, the means for sensing mounted to the housing.

Therefore, an object of this invention is to provide a universal interface unit which is readily adaptable for use on various types of commercial drills and with programmable controllers, or relay logic control's.

Another object of this invention is to provide a compact interface unit which can be used where there is a limited amount of workspace around the drill.

Another object is to provide an attachment means which reduces parts required for assembly and simplifies attachment.

Another object is to provide standardized bracketry which can be used with multiple sizes of drills.

These and other features, advantages, and objects of the present invention will be further understood and appreciated by those skilled in the art by reference to the following specifications, claims and appended drawings.

DESCRIPTION OF THE DRAWINGS

FIG. 1 is a perspective view of an interface unit embodying the present invention mounted to a drill having an axially extendable tool holder;

FIG. 2 is an enlarged partial side view of the interface unit and drill in FIG. 1;

FIG. 3 is an end view of the interface unit and drill in FIG. 1;

FIG. 10 is an electrical diagram of the interface unit wired for use in a 24 VDC circuit; and FIG. 11 is an electrical diagram of the interface unit wired for use in a 120 VAC circuit.

DETAILED DESCRIPTION OF THE PREFERRED EMBODIMENTS

Figure 5:
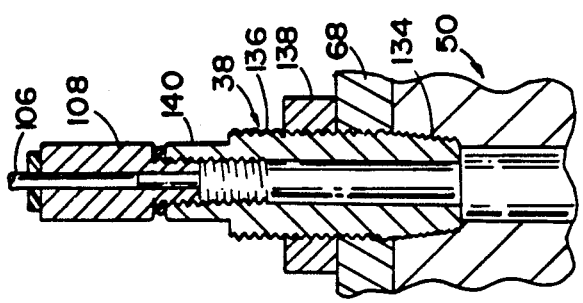
FIG. 5 is an enlarged cross-sectional view taken through lines V—V in FIG. 2.

Reference numeral 20 (FIGS. 1-4) generally designates a universal interface unit which is provided for use with different sized and types of commercially available pneumatic drills 22. Interface unit 20 attaches to a pneumatic drill 22 and, in cooperation with a programmable remote controller unit (not shown), controls an axially extendable tool holder 26 located generally inside of drill casing 30. Interface unit 20 includes a compact housing 28 fastens to casing 30 of pneumatic drill 22. Housing 28 houses one or more proximity sensors 32 for sensing the position of extendable tool holder 26 and also houses valves 34 and 36 for controlling air flow to extend and retract tool holder 26 of drill 22. Housing 26 is secured to drill casing 30 by unique air fittings 38 which thread into extend and retract ports 40 and 42 of casing 30, thus providing a dual function of securing housing 28 to drill casing 30 and also providing air coupling to control extendable tool holder 26.

Pneumatic drill 22 (FIGS. 1-4) is comprised generally of a casing 30 which houses various internal drill components including axially extendable tool holder 26. Drill 22 may be any of a number of commercially available drills such as are offered by Aro Corporation which offers drills having axially extendable tool holders such as Bant-a-matic, Par-a-matic, and Super Par-a-matic models. The pneumatic drill 22 shown has an elongated generally cylindrical casing 30 with a main air vent 46 located centrally along its length and including a main air vent muffler 48 located therein to reduce noise. At the rear end of casing 30 is a manifold block 50 which is generally box like in shape having a flat top side 52 and rear end 54. Flat top 52 includes extend port 40 and retract port 42. Rear end 54 includes a main air supply port 56. A tool holder position indicator shaft 58 extends through rear end 54 a distance rearward of rear end 54. 'L' bracket 60 attaches to indicator shaft 58, 'L' bracket 60 holding a second shaft 62 to which one or more proximity sensor targets 64 are slideably mounted. Main air supply 66 connects to main air supply port 56.

Figure 4:
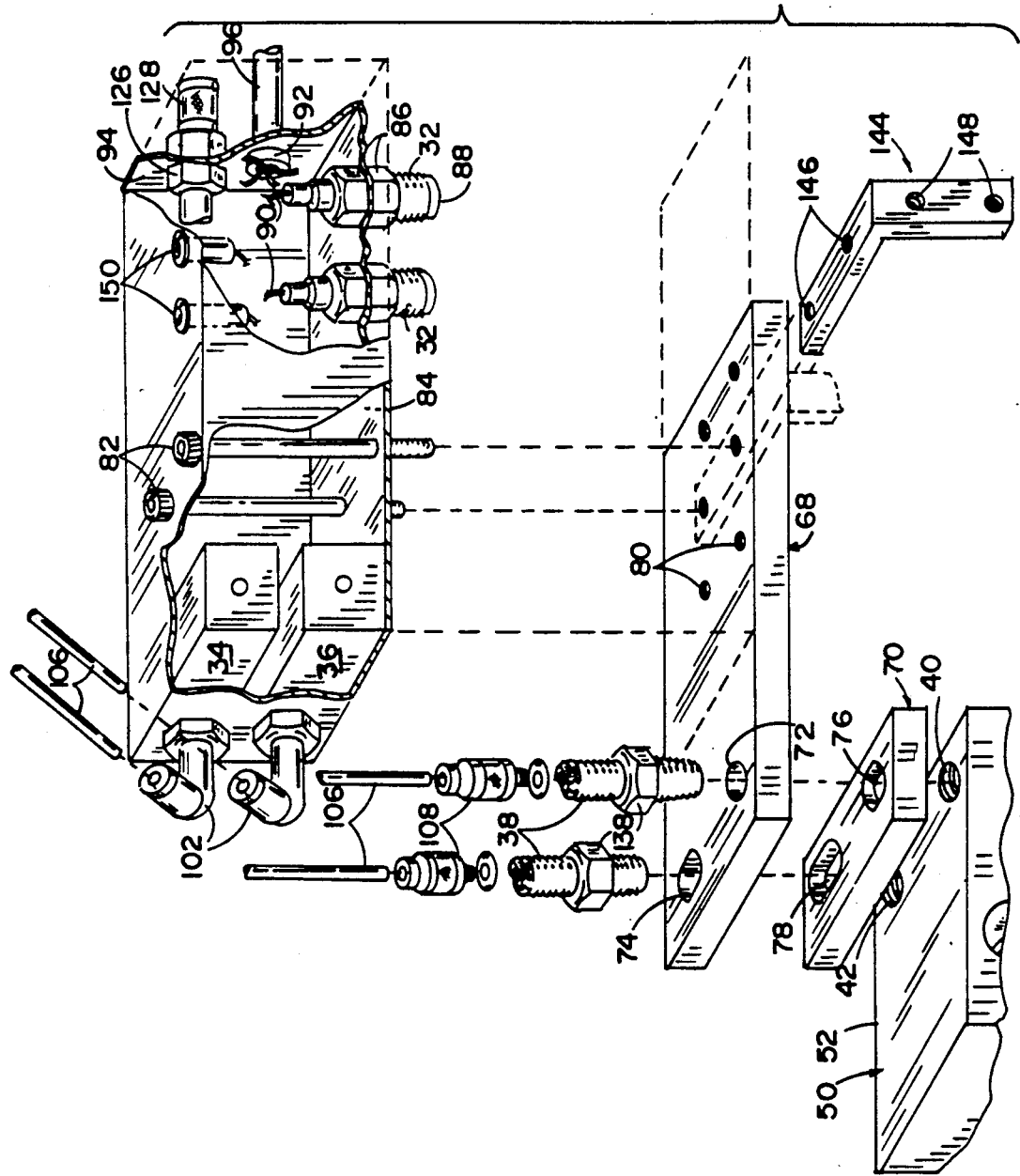
FIG. 4 is an exploded view of the interface unit in FIG. 1.

Interface unit 20 mounts to pneumatic drill 22 by way of a mounting plate 68 and one or more spacers 70 (best shown in FIG. 4). Mounting plate 68 includes a hole 72 and slot 74 such that mounting plate 68 may be matably positioned over extend and retract ports 40 and 42 on manifold block 50 of drill casing 30. Slot 74 is particularly useful in that it allows a single mounting plate 68 to be used on several different sizes of drills 22 wherein extend and retract ports 40 and 42 are spaced apart at slightly different distances. Spacer 70 includes a similar hole 76 and slot 78 which are similar to holes 72 and slot 74 respectively. Spacer 70 is of sufficient thickness (or may be stacked) to achieve a proper thickness such that proximity sensors 32 located within housing 28 are properly positioned with respect to proximity sensor targets 64. Mounting plate 68 further includes multiple pairs of threaded holes 80 which also allow a single mounting plate 68 to be used with various sizes of drills 22.

Interface unit 20 (best shown in FIG. 4) includes a housing 28 which is held to mounting plate 68 by elongated bolts 82 which thread into one pair of threaded holes 80. Housing 28 is substantially box like and includes a lower surface 84 for matably resting against mounting plate 68. Located in the rear of lower surface 84 in one or more locations are proximity sensors 32 which include retaining nuts 86 which allow vertical adjustment of proximity sensors 32, proximity sensors 32 also including a tip sensor 88 located at their lower end. Wire 90 extends from the upper end of proximity sensors 32 and extends through a hole 92 in the rear side 94 of housing 28, joining with other wires as described below to form a communication cable 96 which extends from the rear side 94 of housing 28 to the programmable controller unit 24 located remote from interface unit 20 and pneumatic drill 22.

Within housing 28 near the front end are valves 34 and 36. Valves 34 and 36 have first ports 98 and 100 respectively which are plumbed to extend and retract ports 40 and 42 respectively for communication therewith. Valves 34 and 36 are plumbed to ports 40 and 42 respectively by union elbow fittings 102 which are installed in ports 98 and 100, tubes 106 which pneumatically connect union elbow fittings 102 to male connector air fittings 108, and air fittings 38 which receive male connector air fittings 108. Valves 34 and 36 are positioned so that second ports 110 and 112 are positioned against a side of housing 28. Access openings 114 and 116 are positioned adjacent second ports 110 and 112 such that they can be plugged by plugs 118 and 120 thus blocking or deadheading second ports 110 and 112. Third ports 122 and 124 of valves 34 and 36 are joined at a 'T' connector 125 and routed to an opening 126 at the rear end of housing 28. Third ports 122 and 124 are pneumatically connected to a muffler 128 in the embodiment shown which is intended for use with 'valve in head' type drills. Third ports 122 and 124 may also be connected to an air supply for use with 'thru head' type drills as discussed below.

In the preferred embodiment, valves 34 and 36 are identical electrically operated solenoid valves having a shifted position and a spring returned normal position. The pneumatic diagram is described below, but generally calls for a spool having a normal position with port 98 in open communication with port 110, (port 100 in open communication with port 112) and ports 122 (and 124) deadheaded. The spool also has a shifted position wherein port 98 is in open communication with port 122 (and ports 100 is in open communication with port 124) and port 110 (and 112) are deadheaded.

Figure 6:
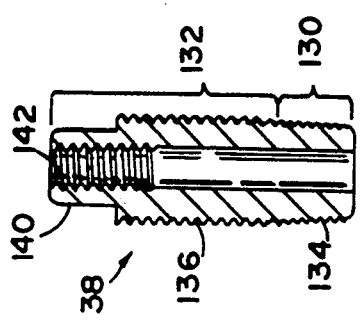
FIG. 6 is an enlarged view of the air fitting in FIG. 5.

Interface unit 20 is held to drill 22 by unique system of attachment which utilizes specialized air fittings 38 (FIGS. 4–6). Air fittings 38 are designed to permit the use of a minimum number of parts, consume a minimum amount of space and provide a universal system of attachment which may be used on a wide variety of commercially available drills without any additional parts. As best shown in FIG. 6, air fitting 38 is substantially tubular having a lower portion 130 and an upper portion 132. Lower portion 38 includes external pipe threads 134 which are designed to sealingly engage extend and retract ports 40 and 42. Upper portion 132 includes external standard threads 136 which will receive a common nut 138 such that air fitting 38 may be installed onto manifold 50 of drill 22, and receive nut 138 to permanently secure mounting plate 68 onto pneumatic drill 22 (FIG. 5). Air fitting 38 includes wrench flats 140 which allow air fitting 38 to be installed within extend and retract ports 40 and 42 with force. Upper portion 132 also includes internal threads 142 for receiving male connector air fitting 108.

Figure 7:
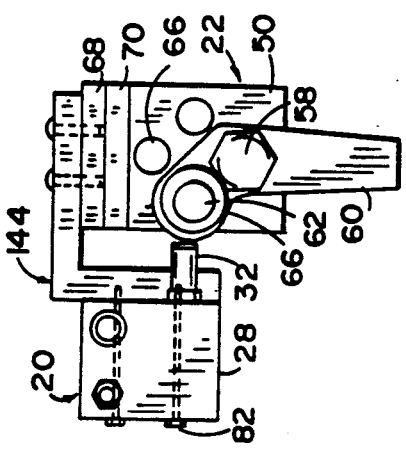
FIG. 7 is a variation of FIG. 3 with the interface unit in a second orientation.

An optional 'L' bracket 144 (FIGS. 4 and 7) can be used to locate universal interface unit 20 on a side different from extend and retract ports 40 and 42. 'L' bracket 144 is useful where the work space around the area to be machined requires a minimum of clearance on the extend and retract port sides of the pneumatic drill 22. 'L' bracket 144 includes pairs of unthreaded holes 146 and threaded holes 148 which are spaced similar to pairs of threaded holes 80 in mounting plate 68. This allows mounting of interface unit 20 to 'L' bracket 144 (by use of holes 146 and 80), and mounting of 'L' bracket 144 to mounting plate 68 (by use of holes 148 and bolts 82). By this manner, housing 28 is properly positioned such that proximity sensors 32 are located adjacent proximity targets 64 but on a different side from extend and retract ports 40 and 42.

Figure 8:
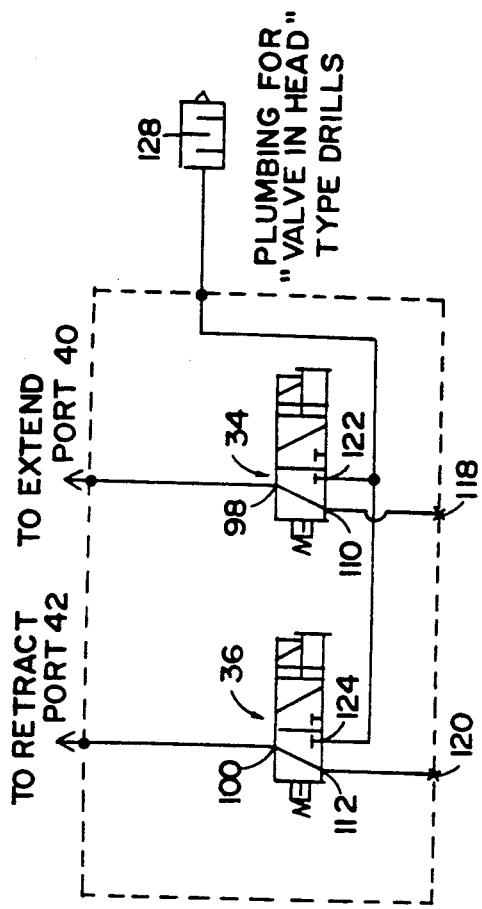
FIG. 8 is a pneumatic diagram of the interface unit plumbed for a 'valve in head' type drill.

As noted previously interface unit 20 is useful for both 'valve in head' type and 'thru head' type drills. The plumbing for 'valve in head' type drills (FIG. 8) is briefly described as follows. Valve 34 has a first port 98 pneumatically connected to extend port 40. The second port 110 of valve 34 is deadheaded by plugging second port 110 by plug 118. The third port 122 of valve 34 is pneumatically joined with third port 124 of valve 36 and vented to air by muffler 128. Valve 36 is similarly plumbed with first port 100 pneumatically connected to retract port 42, second port 112 deadheaded by plug 120, and third port 124 spliced with third port 124 of valve 34 and vented to air by muffler 128.

Figure 9:
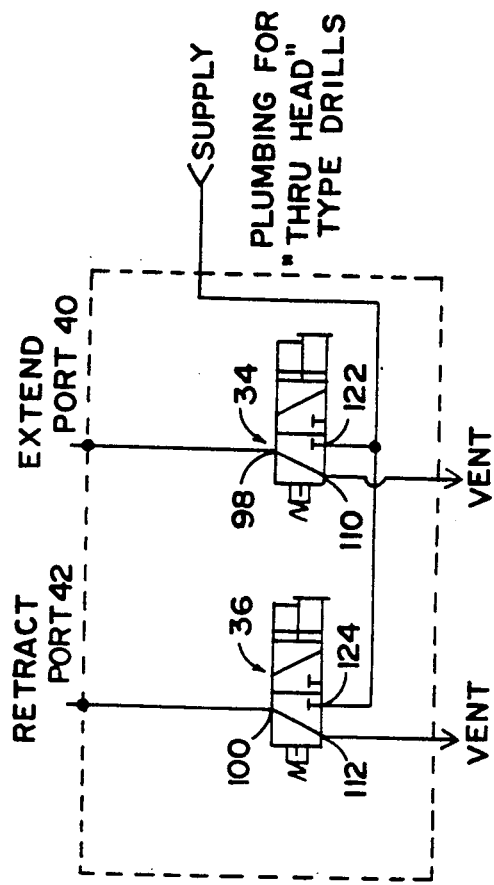
FIG. 9 is a pneumatic diagram of the interface unit plumbed for a 'thru head' type drill.

The plumbing for 'thru head' type drills (FIG. 9) is substantially similar to plumbing for 'valve in head' type drills except that second ports 110 and 112 are plumbed as venting to air, and third ports 122 and 124 are connected to an air supply.

Conversion from 'valve in head' type drills to 'thru head' type drills is accomplished by removing plugs 118 and 120 (thus venting second ports 110 and 112), and removing muffler 128 and re-connecting third ports 122 and 124 to an air supply.

Interface unit 20 may be configured for 24 volt direct current operation or 120 volt AC current operation The 24 VDC version (FIG. 10) includes parallel wires 90 which extend from each proximity switch to the remote programmable controller unit. The 24 VDC version also includes separate power supplies routed to the solenoid of each valve 34 and 36. The housings of valves 34 and 36 and the housings of proximity switches 32 are grounded to a common ground back at the remote programmable controller as is commonly done in the art.

The 120 volt AC conversion includes parallel wires 90 which extend from each proximity switch 32 back to the remote controller unit. The 120 volt AC version also includes separate power supply wires to each solenoid with a common ground returning back to the remote controller unit. In both the 24 VDC and 120 AVC Versions, the interface unit housing 28 is grounded. Indicator lights 150 may be optionally mounted to housing 28 and electrically connected to (FIG. 10-11) to indicate that proximity switches 32 have been tripped. This can be used for setup purposes to properly position proximity switch targets 64.

CONVERSION BETWEEN TYPES OF DRILLS

As noted, interface unit 20 may be easily converted from 'valve in head' type 'thru head' type drills. To install in a 'valve in head' type drill, interface unit 20 is prepared by installing plugs 118 and 120 to second ports 110 and 112 thus deadheading ports 110 and 112 in valves 34 and 36, and connecting muffler 128 to third ports 122 and 124 thus venting ports 122 and 124. To prepare interface unit 20 for 'thru head' type drills, plugs 118 and 120 are removed thus venting second ports 110 and 112, and an air supply is connected to third ports 122 and 124 of valves 34 and 36.

OPERATION

Use of interface unit 20 with a 'valve in head' type drill is as follows. Interface unit 20 is prepared for a 'valve in head' type drill as noted above and is mounted to mounting plate 68 which is in turn mounted by air fittings 38 to manifold block 50 of pneumatic drill 22. Spacers 70 are utilized as needed to properly position proximity sensors 32 in relation to proximity targets 64. Proximity targets 64 are adjusted fore and aft on second shaft 62 to indicate critical positions of axially extendable tool holder 26. When it is desired to extend tool holder 26, the remote controller unit actuates the solenoid on valve 34 shifting the spool in valve 34 such that extend port 40 is vented through muffler 128 causing tool holder 126 to extend. The programmable controller is programmed to activate valve 34 as signals are received from the various proximity sensors 32 as they pass various targets 64. When appropriate, the programmable controller stops the signal to the solenoid of valve 34, and a spring returns the spool of valve 34 to its normal position wherein second port 110 is plugged. When it is desired to retract tool holder 26, the controller actuates the solenoid in valve 36 thus shifting the spool of valve 36 and venting retract port 42 to muffler 128. Once the programmable controller senses through proximity sensors 32, that tool holder 26 is properly retracted, the programmable controller deactivates the solenoid to valve 36 and a spring returns the spool in valve 36 to its normal position wherein second port 112 is deadheaded.

The operation of a 'thru head' type drill with interface unit 20 is similar with respect to cycling of valves 34 and 36 and the sensing of proximity sensors 32. The difference, of course, is that in the 'thru head' type drill plumbing arrangement, second ports 110 and 112 are normally vented and third ports 122 and 124 are normally supplied with air. Thus, to extend tool holder 26, controller 24 actuates a solenoid to valve 34 causing supply air to be routed into extend port 40 causing tool holder 26 to extend. When tool holder 26 is properly extended, the controller 24 allows valve 34 to be spring returned to a normal position wherein second port 110 is vented. Similarly, retract port is supplied with supply air to actuate tool holder 26 to return.

Thus, an interface unit is provided for use with different types of commercially available pneumatic drills having axially extendable tool holders, the interface unit facilitating control over the pneumatic drill by a controller located remote from the drill. In the preferred embodiment, the interface unit includes a housing mounted to the drill which includes one or more valves and one of more proximity sensors. The preferred embodiment also includes a means of attaching the housing to the drill to minimize parts and maximize utilization of space.

In the foregoing description, it will be readily appreciated by those skilled in the art that modifications may be made to the invention without departing from the concepts disclosed herein. Such modifications are to be considered as includes in the following claims, unless these claims by their language expressly state otherwise.

The embodiments of the invention in which an exclusive property or privilege is claimed are defined as follows:

1. An interface unit for use with a pneumatic drill, the drill including an axially extendable tool holder and having tool holder extend and retract ports, the interface unit facilitating control over the axially extendable tool holder by a programmable controller unit located remote from the drill, the interface unit comprising:

a housing;

means for mounting the housing to the drill;

means for sensing the position of the axially extendable tool holder, the means for sensing mounting to the housing and communicating with the remote controller unit;

at least one valve located in the housing for communication with the extend and retract ports; and means for controlling said at least one valve from a remote controller unit.

2. The device as defined in claim 1 including means for adapting the interface unit for use with 'thru head' type drills and 'valve in head' type drills.

3. The device as defined in claim 2 wherein the valve includes a first and second control port and a removable plug, the first control port adapted to communicating supply air when connected to 'thru head' type drills and adapted to venting air when connected to 'valve in head' type drills, and the second control port being adapted to venting air when connected to 'thru head' type drills and to being closed off by the removable plug to prevent venting of air when connected to 'valve in head' type drills.

4. The device as defined in claim 3 wherein the housing includes a hole and the second control port is located adjacent the hole so that the removable plug may be inserted and removed from outside the housing.

5. The device as defined in claim 1 wherein said at lease one valve includes first and second valves located in the housing, the first valve communicating with the extend port and the second valve communicating with the retract port.

6. The device as defined in claim 1 wherein the valve is an electrically operated solenoid valve.

7. The device as defined in claim 1 wherein the means for mounting the housing to the drill includes at least one air fitting adapted to engaging one of the extend and retract ports, the air fitting including means to secure the housing to the drill and further including an internal passageway for communicating with one of the extend and retract ports.

8. The device as defined in claim 7 wherein the air fitting is substantially tubular and includes an upper and lower portion, the lower portion including external pipe threads for sealingly engaging one of the retract and extend ports, the upper portion including external threads;
- a mounting plate is suitably shaped to matingly fit around the air fitting, the mounting plate being securely attached to the housing; and
- a nut is suitably shaped to thread onto the upper portion of the air fitting to hold the mounting plate securely to the drill.

9. The device as defined in claim 8 wherein the upper portion of the air fitting also includes flats to facilitate installation of the air fitting onto one of the extend and retract ports.

10. The device as defined in claim 9 where the mounting plate includes means for adjustment to facilitate use of the mounting plate on different sizes of drills.

11. The device as defined in claim 7 wherein the drill has multiple sides, and the housing includes a bracket suitably shaped to position the housing on a side different from the extend and retract ports to facilitate use of the interface unit in tight quarters.

12. The device as defined in claim 1 wherein the means for sensing includes at lease one proximity sensor.

13. The device as defined in claim 12 including at least one adjustable target which correspondingly moves with the axially extendable tool holder, the target cooperating with the proximity sensors to indicate the position of the tool holder.

14. The device as defined in claim 1 wherein the means for sensing includes a quick disconnect mounted in the housing for detachably connecting communication cables from the remote controller to the means for sensing and means for controlling the valves.

15. An interface unit for use with a pneumatic drill, the drill including an axially extendable tool holder and having tool holder extend and retract ports, the interface unit facilitating control over the axially extendable tool holder by a programmable controller unit located remote from the drill, the interface unit comprising:
- a housing;
- means for mounting the housing to the drill;
- at least one valve located in the housing for communication with the extend and retract ports, said at least one valve further including means for adapting the interface unit to be used with 'thru head' type drills and means for adapting the interface unit to be used with 'valve in head' type drills; and
- means for controlling the valves from a remote controller unit.

16. The device as defined in claim 15 wherein said at least one valve includes first and second valves located in the housing, the first valve communicating with the extend port and the second valve communicating with the retract port.

17. The device as defined in claim 16 wherein the first and second valves each include a first and second control port and a removable plug, the first control port being useful for communicating supply air when connected to 'thru head' type drills and useful for venting air when connected to 'valve in head' type drills, and the second control port being useful for venting air when connected to 'thru head' type drills and closed off by the removable plug to prevent venting of air when connected to 'valve in head' type drills.

18. The device as defined in claim 17 wherein the housing includes a hole and the second control port is located adjacent the hole so that the removable plug may be inserted and removed from outside of the housing.

19. The device as defined in claim 15 wherein the valve is an electrically operated solenoid valve.

20. The device as defined in claim 15 wherein the means for mounting the housing to the drill includes at least one air fitting adapted to engage one of the extend and retract ports, the air fitting including means to secure the housing to the drill and further including an internal passageway for communicating with one of the extend and retract ports.

21. The device as defined in claim 20 wherein the air fitting is substantially tubular and includes an upper and lower portion, the lower portion including external pipe threads for sealingly engaging one of the retract and extend ports, the upper portion including external threads;
- a mounting plate is suitably shaped to matingly fit around the air fitting, the mounting plate being securely attached to the housing; and
- a nut is suitably shaped to thread onto the upper portion of the air fitting to hold the mounting plate securely to the drill.

22. The device as defined in claim 21 wherein the upper portion of the air fitting also includes flats to facilitate installation of the air fitting onto one of the extend and retract ports.

* * * * *

UNITED STATES PATENT AND TRADEMARK OFFICE
CERTIFICATE OF CORRECTION

PATENT NO. : 5,094,570

DATED : March 10, 1992

INVENTOR(S) : Arnold E. LaCombe, Jr. et al.

It is certified that error appears in the above-identified patent and that said Letters Patent is hereby corrected as shown below:

```
Column 6, claim 1, line 40:
    "mounting" should be
    --mounted--.
```

Signed and Sealed this

Twenty-eighth Day of September, 1993

Attest:

BRUCE LEHMAN

Attesting Officer  Commissioner of Patents and Trademarks